United States Patent
Auranen et al.

(10) Patent No.: US 6,397,278 B1
(45) Date of Patent: May 28, 2002

(54) BUS CONSTRUCTION

(75) Inventors: Tommi Auranen; Pekka Talmola, both of Turku (FI)

(73) Assignee: Nokia Technology GmbH, Bochum (DE)

( * ) Notice: Subject to any disclaimer, the term of this patent is extended or adjusted under 35 U.S.C. 154(b) by 0 days.

(21) Appl. No.: 09/390,589

(22) Filed: Sep. 3, 1999

(30) Foreign Application Priority Data

Sep. 4, 1998 (FI) ................................................ 981894

(51) Int. Cl.[7] ............................................... G06F 13/00
(52) U.S. Cl. ...................... 710/105; 710/315; 710/316
(58) Field of Search ............................... 710/105, 305, 710/306, 315, 316, 11, 62, 72; 709/230, 250, 253; 370/357, 360, 362

(56) References Cited

U.S. PATENT DOCUMENTS 5,376,928 A * 12/1994 Testin ....................... 340/825.5
5,812,802 A * 9/1998 Bahout et al. ............... 710/305
5,884,044 A    3/1999 Marsanne et al. ...... 395/200.62
5,892,933 A * 4/1999 Voltz ........................... 710/316
6,092,138 A * 7/2000 Schutte ....................... 710/113

FOREIGN PATENT DOCUMENTS

EP          0759593       2/1997
EP          0769748       4/1997
JP          5-308392      11/1993

OTHER PUBLICATIONS

"The I²C-bus and how to use it", Philips Semiconductors 80C51-Based 8-Bit Microcontrollers, Jan. 1992, pp. 1141-1159.

* cited by examiner

Primary Examiner—Xuan M. Thai

(57) ABSTRACT

A bus construction (20) for connecting a circuit (14) controlled via a separate control port (26c) to a bus controlled by addressing, in which the signal paths (24a, 24b) connected to the I/O ports (26a, 26b) of the circuit (14) with a separate control port are connected to the corresponding signal paths (23a, 23b) of the bus controlled by addressing by means of switches (22a, 22b).

9 Claims, 1 Drawing Sheet

BUS CONSTRUCTION

BACKGROUND OF THE INVENTION

1. Technical Field

The invention relates to a bus construction for connecting a circuit controlled via a separate control port to a bus controlled by addressing.

2. Discussion of Related Art

In the technical world of today, people use more and more electronic devices in their everyday life. Almost all modern products of consumer electronics contain a microprocessor that controls the device. The microprocessor can be connected to the other integrated circuits of the device by using a known bus construction. One of the most common bus constructions is the I²C bus as described in "Philips Semiconductors, 80C51-Based 8-bit Microcontrollers", Book IC20 1994, Philips, pages 1141–1159, and other bus constructions controlled by addressing. The I²C bus comprises DATA and CLOCK signal paths, through which the control commands according to the I²C standard are sent to the circuits connected to the I²C bus to control the circuits.

However, not all integrated circuits support a bus construction controlled by addressing. For example, the control of phase-locked loops is generally implemented by means of a control signal brought to the control port of the circuit via a separate signal path. A solution like this can be implemented, for example, as a 3-wire or IM bus solution based on three signal paths, as described in "Fernsehtechnik ohne Ballast", Otto Limann/Horst Pelka, ISBN 3-7723-5723-7, Franzis-Verlag GmbH, 1993, pp. 498–503. The instruction set of circuits controlled via a separate control port differs from the instruction set of circuits controlled by addressing. Because of this, in prior art systems in which there are both circuits that are controlled by addressing and circuits controlled by a separate control port, the buses are typically separated from each other, for example like in FIG. 1.

In the prior art solution shown in FIG. 1, an I²C bus 12 controlled by addressing connects the microprocessor 11 by means of two signal paths (DATA, CLOCK) to the first and the second I/O circuit 15 and 16, and a 3-wire bus 13 based on a separate control signal connects the microprocessor 11 by three signal paths (DATA, CLOCK, ENABLE) to the phase-locked loop 14. If many separately controlled circuits were connected to the bus 13, each one would need its own ENABLE, i.e. control, signal path. The I²C bus 12 is connected to the first I/O ports 17 of the microprocessor 11, and the 3-wire bus 13 is connected to the second I/O ports 18 of the microprocessor. Thus the microprocessor can control each bus 12 and 13 separately, and the signals of one bus cannot interfere with the operation of the other bus.

In order to simplify the construction of electronic devices and the program that controls the microprocessor, it is a general objective to minimize the number of signal paths and thereby also the number of I/O ports to the processor. In accordance with the prior art described above, each bus type is given its own I/O port and signal path.

SUMMARY OF INVENTION

The purpose of this invention is to achieve a new bus construction, which enables connecting circuits of different standards to the same path, whereby the number of the signal paths used and the number of the I/O ports used of the processor can be reduced in comparison to the prior art solution. The objectives are achieved by connecting the signal paths connected to the CLOCK and DATA inputs of the circuit controlled by a separate control port, such as a 3-wire circuit, via switches to the corresponding signal paths of a bus controlled by addressing, such as an I²C bus.

The bus construction according to the invention is characterized in what is set forth in the characterizing part of claim 1. The preferred embodiments of the invention are described in the dependent claims.

Compared to the prior art, the invention has the advantage of simplifying the bus construction of the device by reducing the number of the signal paths and I/O ports of the processor in use.

Furthermore, the invention provides the possibility to separate the signal paths of different buses by means of analog switches, whereby a circuit controlled by a separate control port can be disconnected from the bus construction controlled by addressing, whereby the signals directed to circuits that use addressing cannot get to the I/O ports of the circuit controlled via a separate control port. In this way, signal interference in the operation of the circuit is avoided, and therefore the use of switches improves the reliability of the device compared to a solution in which signal paths according to different standards are connected without switches.

BRIEF DESCRIPTION OF THE DRAWING

In the following, the invention will be described in more detail with reference to the accompanying drawings, in which.

DETAILED DESCRIPTION OF PREFERRED EMBODIMENTS

Figure 1:
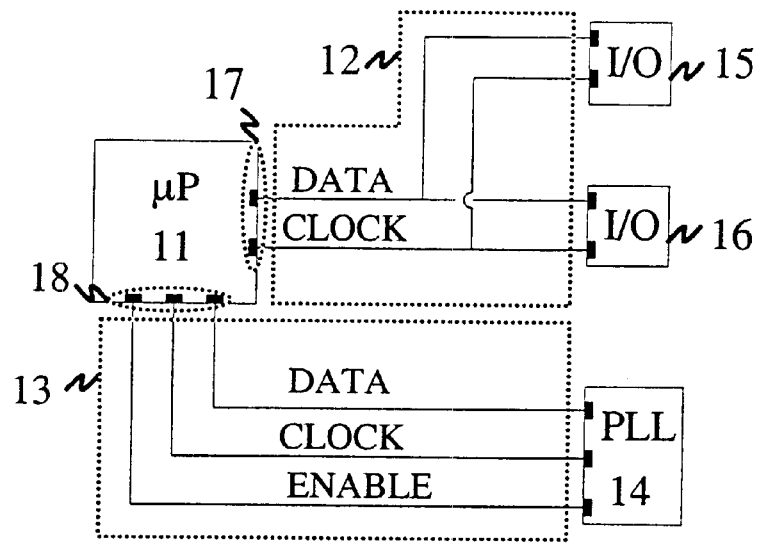
FIG. 1 shows a prior art bus construction.

FIG. 1 was dealt with above in connection with the description of the prior art.

Figure 2:
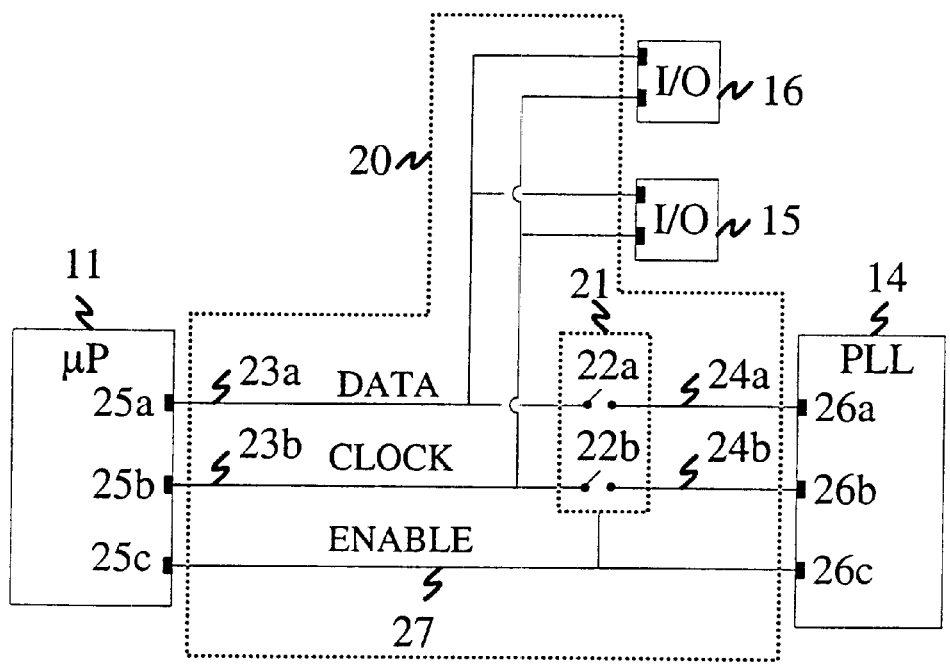
FIG. 2 shows a bus construction according to the invention.

FIG. 2 shows an embodiment of a bus construction 20 according to the invention. In FIG. 2, there are only three signal paths 23a (DATA), 23b (CLOCK) and 27 (ENABLE) from the processor 11, whereas in the prior art solution shown in FIG. 1, there are five signal paths from the processor 11, two to an I²C bus 12 controlled by addressing and three to a bus 13 containing a circuit controlled via, enable control port of the PLL 14. The bus construction 20 may be part of a digital receiver.

The reduction of signal paths is enabled by combining the DATA signal paths 23a and 24a and the CLOCK signal paths 23b and 24b of different bus types, respectively. Thus the signal paths 23a and 23b connected to the DATA and CLOCK outputs 25a and 25b of the processor are used to transmit instructions both to circuits controlled by addressing and to circuits controlled via a separate control port 26c. How each circuit communicating with the microprocessor 11 is able to recognize the signals intended for it from among the signals running in the signal paths 23a; 23b and 24a; 24b depends on the standard the circuit employs. The circuits 15, 16 controlled by addressing recognize the signals intended for them from the commands sent by the processor 11 to the signal paths 23a and 23b, such as the START command of the I²C standard.

A circuit 14 with a separate control input 26c, such as a 3-wire phase-lock loop, recognizes the signals intended for it from among the signals running in the signal paths 24a and 24b by means of the ENABLE signal sent by the processor 11 via the ENABLE port 25c along the signal path 27. Having received from the signal path 27 the ENABLE signal sent by the processor 11, the circuit 14 starts to receive the signals running in the signal paths 24a and 24b, until the processor 11 sends notice that the commands coming to the circuit 14 have been executed by changing the signal to NON_ENABLE. The above mentioned ENABLE/NON_ENABLE signals can be implemented in a known manner, e.g. so that a certain voltage level denotes an ENABLE signal and a certain other voltage level, such as a level close to zero, denotes a NON_ENABLE signals. The circuit 14 may be capable of duplex data transfer.

By separating the DATA and CLOCK signal paths 24a and 24b based on a standard using a separate control signal from the signal paths 23a and 23b based on a standard that uses addressing by means of switches 22a and 22b, the access of signals related to address-controlled bus traffic to the DATA and CLOCK ports 26a and 26b of the circuit 14 controlled via a separate control port 26c is prevented. In this way for example, a 3-wire phase-lock loop is protected against the bus signals, which could for example in digital receiver circuits cause disturbances, such as spectrum peaks or an increase of phase noise in the spectrum of the local oscillator.

The bus construction according to the invention provides a better bit error ratio and thus also a better quality of the image, voice or data received than a combination of signal paths implemented without switches.

The switches 22a and 22b can be advantageously implemented as analog ones, whereby the I/O ports 26a and 26b of the circuit 14 controlled via a separate control port can be analogically separated from the bus controlled by addressing. The switches 21 can, e.g., be closed in the presence of the ENABLE signal and opened in the presence of the NON-ENABLE signal. Analog separation results in a better interference protection than a digital switch configuration implemented by means of logic gates, for instance, because interference can enter the I/O ports 26a, 26b of the circuit 14 through the ground potential in a digital solution. Furthermore, using analog switches enables implementing the data transfer between the circuit 14 controlled via a separate control port 26c and the processor 11 as duplex, which would be more complicated in a digital switch construction based on logic gates, because the direction of the signal cannot be changed in logic gates.

Switches 22a and 22b according to FIG. 2 can be implemented by a switch circuit 21, such as an integrated analog switch, e.g. 74HC4053, or the switch construction can be implemented in a known manner by a FET switch composed of separate components.

The solution according to the invention is not limited to the above described examples only, but can vary within the scope defined by the attached claims.

What is claimed is:

1. A bus construction (20) for connecting a circuit (14) controlled via a separate control port (26c) to a bus controlled by addressing, wherein signal paths (24a, 24b), connected to I/O ports (26a, 26b) of the circuit (14) controlled via a separate control port (26c) are connected by means of switches (22a, 22b) to corresponding signal paths (23a, 23b) and the bus controlled by addressing.

2. A bus construction (20) according to claim 1, wherein said circuit (14) controlled via a separate control port (26c) is a 3-wire type.

3. A bus construction (20) according to claim 1, wherein said bus controlled by addressing is an I$^2$C bus.

4. A bus construction (20) according to claim 1, wherein said switches (22a, 22b) are controlled by a signal used to control the circuit (14) controlled via said separate control port (26c).

5. A bus construction (20) according to claim 1, wherein said switches (22a, 22b) are analog switches.

6. A bus construction (20) according to claim 5, wherein said circuit (14) controlled via a separate control port (26c) is capable of duplex data transfer.

7. A bus construction (20) according to claim 1, wherein said switches (22a, 22b) are implemented by a switch circuit (21).

8. A bus construction (20) according to claim 1, wherein said circuit (14) controlled via a separate control port (26c) is a phase-lock loop.

9. A bus construction (20) according to claim 1, wherein said bus construction (20) is part of a digital receiver.

* * * * *